United States Patent Office 3,045,011
Patented July 17, 1962

3,045,011
OXIMINO STEROIDAL DERIVATIVES AND PROCESSES FOR THEIR MANUFACTURE
Alexander L. Nussbaum, Palo Alto, Calif., assignor to Schering Corporation, Bloomfield, N.J., a corporation of New Jersey
No Drawing. Filed Dec. 20, 1961, Ser. No. 160,931
20 Claims. (Cl. 260—239.55)

This invention relates to novel 16-oximino-steroids, to methods for their manufacture, and to intermediates useful in the preparation thereof. More particularly, this invention relates to novel, therapeutically active 16-oximino-17β,20α-oxidopregnanes and to novel 16-oximino-20-ketopregnanes derived therefrom including 16-oximino-ester derivatives of the foregoing.

Included among the 16-oximinopregnanes of my invention are compounds having the following structural formulae:

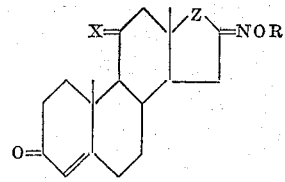

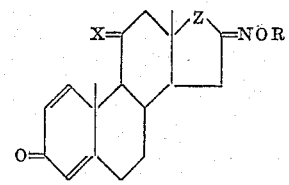

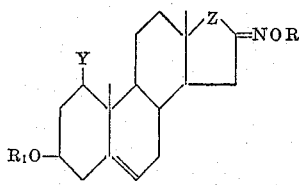

wherein R and $R_1$ are members of the group consisting of hydrogen and an acyl radical of a hydrocarbon carboxylic acid having up to 8 carbon atoms; X is a member of the group consisting of hydrogen and oxygen; Y is a member of the group consisting of hydrogen and —$OR_2$, $R_2$ being selected from the group consisting of hydrogen and an acyl radical of a hydrocarbon carboxylic acid having up to 8 carbon atoms; and Z is selected from the group consisting of;

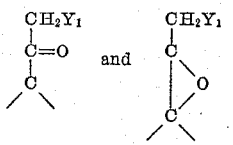

$Y_1$ being selected from the group consisting of hydrogen and $OR_3$ wherein $R_3$ is a member of the group consisting of hydrogen and an acyl radical of a hydrocarbon carboxylic acid having up to 8 carbon atoms. Illustrative of the acyl radicals contemplated for R, $R_1$, $R_2$, and $R_3$ are those of lower alkanoic acids such as acetic, propionic, butyric, valeric, caproic, and t-butyl acetic as well as the radicals of aryl acids such as benzoic and toluic acids.

Also included in my invention are lower alkyl analogs of the compounds of the above structural formulae and particularly those which are substituted by methyl or ethyl at the 2 and 6 carbon positions, such as, for example, 6-methyl-16-oximino-17β,20α-oxido-4-pregnene-3-one and 6α-methyl-16-oximino-17β,20α-oxido-4-pregnene-21-ol-3,11-dione.

My invention thus includes the 16-oximino-17β,20α-pregnanes of Formulae I, II, and III as well as the 16-oximino-20-keto-pregnanes of Formulae IV, V, and VI shown below wherein X, Y, $Y_1$, R and $R_1$ are defined as hereinabove.

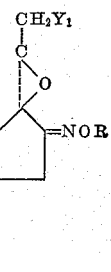

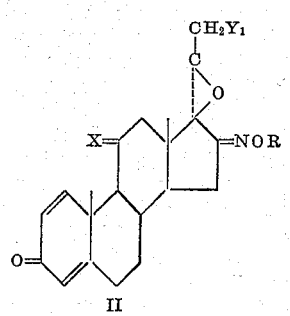

and

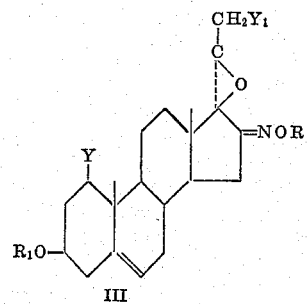

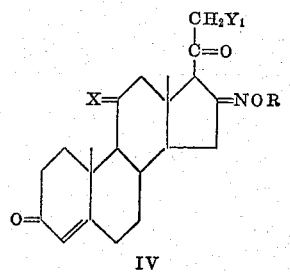

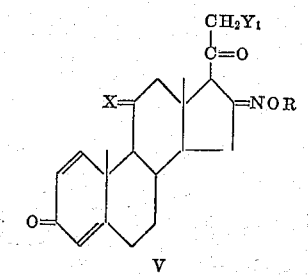

and

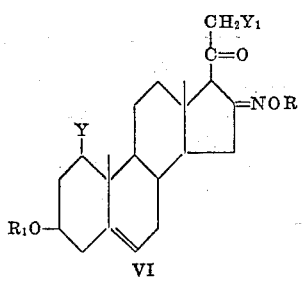

VI

Included among the novel 16-oximino-17β,20α-oxido-pregnanes of Formulae I, II, and III are: 16-oximino-17β,20α-oxido-4-pregnene-3-one and the acetate ester thereof, 16-oximino-17β,20α-oxido-5-pregnene-3β-ol- and the 3,16-diacetate ester thereof, 16-oximino-17β-20α-oxido-4-pregnene-21-ol-3,11-dione and the 21-acetate and 16,21-diacetate esters thereof, 16-oximino-17β,20α-oxido-1,4-pregnadiene-3-one and 16-oximino-17β,20α-oxido-1,4-pregnadiene-21-ol-3,11-dione and the diacetate ester thereof.

The 16-oximino-17β,20α-oxido-pregnanes of this invention, including the compounds of Formulae I, II, and III and the methyl analogs thereof, are prepared by my novel process whereby the 20-nitrite ester of a 20α-hydroxy-16-pregnene in a dry, non-polar solvent, such as benzene or toluene, to which pyridine has been added is irradiated under nitrogen with ultra-violet radiation which possesses a band of radiation corresponding to at least some of the absorption bands of the nitrite radical.

For example, by my process 5,16-pregnadiene-3β,20α-diol is reacted with nitrosyl chloride in pyridine, and the resultant 5,16-pregnadiene-3β,20α-diol dinitrite is dissolved in benzene containing 1% pyridine and then subjected to ultra-violet light irradiation whereby there is formed 16-oximino-17β,20α-oxido-5-pregnene-3β-ol.

It is to be noted at this point that, throughout the specification and in the claims of this application, the meaning of the configurations "α" and "β" when applied to the bonding at C-20, differs from the meaning of "α" and "β" when used in designating bond configurations on nuclear carbons such as at C-3 and at C-17. Both systems of nomenclature are well known to those skilled in the steroid art and are described by Fieser and Fieser, Steroids, Reinhold (1959), the C-20 bond configuration designation being discussed on pages 337 and 338 and the nuclear carbon-bond designations being discussed in Chapter I, and particularly on pages 1 and 2. Thus, by a 20α-hydroxypregnane we mean a pregnane compound having the 21-methyl group directed to the rear of the 20-carbon atom and the hydrogen and hydroxyl group directed to the front of the 20-carbon atom, with the hydroxyl group lying to the right and the hydrogen to the left of the 20-carbon atom. On the other hand, at C-17 in "α" designation signifies a bond projected to the rear or underside of the molecule and is represented by a broken line, whereas a "β" designation at C-17 signifies a bond projected to the front or upper side of the molecule and is represented by a solid line.

From the above described system of nomenclature as used in this application, it is clear that by 5,16-pregnadiene-3β,20α-diol is meant a compound having a hydroxyl group to the right of the 20-carbon as shown below:

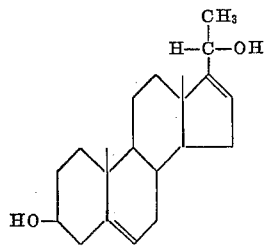

It is also clear that by 16-oximino-17β,20α-oxido-5-pregnene-3β-ol is meant a steroid wherein the oxygen attached to C-17 and C-20 lies at the right of C-20 (hence 20α) and lies in the plane projected to the front or upper side of the pregnane nucleus and thus is bonded to C-17 in a "β" configuration. With the oxido group being in a 17β,20α-position, the 20-carbon, of necessity, is bonded to the 17-carbon in an "α" position as designated by the broken bond lines between C-17 and C-20 in Formulae I, II, and III. When there are no substituents at C-17 except the acetyl side chain, this chain is in a "β" position as shown in Formulae IV, V, and VI.

In my process whereby the aforementioned 16-oximino-17β,20α-oxidopregnanes and the 16-oximino-20-ketopregnanes of this invention are prepared by the ultraviolet irradiation of a pyridine-containing solution of a 20-nitrite ester of a 16-dehydro-20α-hydroxy pregnane, the necessary intermediates are 16 - dehydro - 20α - hydroxypregnanes. Some are known, such as 5,16-pregnadiene-3β,20α-diol; while others are conveniently prepared by reducing the 20-ketone function of the corresponding 16-dehydro-20-ketopregnanes by means of known reduction techniques such as those utilizing metal hydrides, and, in particular, lithium aluminum hydride in tetrahydrofuran and sodium borohydride in methanol. Prior to reducing the 20-keto function, it is preferable to protect any other active ketone functions present in the molecule, such as at C-3, by forming derivatives thereof, for example ketals, enol-ethers, and the like. When the reduction of the 20-ketopregnane is complete, the desired 20α-hydroxy-16-dehydropregnane is usually isolated from the resultant isomeric mixture of 20α- and 20β-hydroxysteroids by utilizing chromatographic techniques well known in the art. After isolation, any ketone protective derivatives present in the 20α-hydroxy-16-dehydropregnane may be hydrolyzed by known methods to regenerate the free ketone function.

The following chromatographic techniques are particularly useful in separating isomeric mixtures of 20α-hydroxy-16-pregnene and 20β-hydroxy-16-pregnene resulting from the metal hydride reduction of a 20-keto-16 pregnene:

(1) Thin layer chromatography on silica gel with ether as eluant;

(2) Paper chromatography utilizing the following systems: heptane-phenyl Cellosolve, heptane-methyl Cellosolve, ligroin-propylene glycol, toluene-propylene glycol; and (3) Adsorption chromatography on Florisil utilizing ether as eluant and combining fractions having identical infra-red spectra.

In the aforedescribed manner, 16-dehydroprogesterone (4,16-pregnadiene-3,20-dione) is converted to a starting intermediate of my novel process, i.e., 4,16-pregnadiene-20α-ol-3-one. Protection of the 3-keto-function is effected by selective conversion to the 3-enol ether utilizing 2,2-dimethoxypropane and dimethylformamide in the presence of catalytic quantities of p-toluenesulfonic acid monohydrate and methanol. The resultant 3-enol ether, i.e., 3,5,16-pregnatriene-3-ol-20-one 3-methyl ether, upon reduction with lithium aluminum hydride in tetrahydrofuran in known manner, followed by acid hydrolysis of the 3-enol ether and subsequent adsorption chromatography of the isomeric mixture of 4,16-pregnadiene-20-ol-3-one on Florisil using benzene as solvent and ethyl ether as eluate, yields the desired starting compound of my process, namely 4,16-pregnadiene-20α-ol-3-one.

From the 20α-hydroxy-16-dehydropregnanes are prepared the 20α-nitrite-16-dehydropregnane intermediates of my process by reacting a solution of a 20α-hydroxy-16-dehydropregnane in pyridine, dimethylformamide, ethyl acetate, or other non-polar solvent (and preferably in pyridine), with a nitrosyl halide, preferably nitrosyl chloride. The nitrosyl chloride or bromide used may be added to the 20α-hydroxy-16-dehydropregnane solution in the same solvent as that used to dissolve the 20α- hydroxypregnane or, alternatively, it may be introduced a a gas into the solution of the steroid. The formation of the 20α-nitrite ester is usually rapid and the progress of the reaction may be followed by a change in the color of the solution so that when the blue-green or other color of the nitrosyl chloride is no longer discharged or changed by reaction with the dissolved 20α-hydroxy steroid it can be assumed that the 20α-nitrite has formed and the compound in solution is ready for separation and photolysis. The temperature at which the nitrite formation reactions usually are carried out ranges from −30° to +30° C. In general, when nitrosyl chloride is the reactant used, the reaction temperature usually ranges from 0° C. to −30° C., and preferably from −20° C. to −30° C.

After completion of the formation of the 20α-nitrite ester, the nitrite is separated usually by adding water to the solution to precipitate the nitrite and by subsequent filtering followed by crystallization and recrystallization, if desired. In the process of this invention, it is not always necessary to further purify the nitrite ester after isolation and drying.

When preparing the 20α-nitrite ester intermediates of this invention, the hydroxyl group at C–3 of 5,16-pregnadiene-3β,20α-diol will also esterify, and there is formed the corresponding 3,20-dinitrite. However, the 3-nitrite ester will not enter into the reaction upon irradiation with ultraviolet light and after irradiation, will be isolated unchanged as the free hydroxyl function. However when preparing a novel compound, of my invention, any hydroxy groups present other than at C–20, are usually preferably protected by esterification prior to preparation of the 20-nitrite ester and irradiation according to my process. Thus, 11-dehydrocorticosterone is preferably converted to the 21-acetate prior to reduction with lithium aluminum hydride and conversion of the 4-pregnene-20α,21-diol-3,11-dione 21-acetate thereby formed to the corresponding 20-nitrite ester and subsequent photolysis thereof. If a 21-hydroxyl derivative is desired, the 16-oximino-17β,20α-oxido-4-pregnene-21-ol - 3,11 - dione 21 - acetate formed by the process outlined, may be hydrolyzed microbiologically with *Flavobacterium dehydrogenans* (Rutgers Collection No. 130) according to the procedure described in Example 6C of this application.

Similarly, in my process 5,16-pregnadiene-1β,3β-diol-20-one is preferably converted to the corresponding 1,3-diacetate by means of acetic anhydride and pyridine prior to reduction of the 20-ketone with sodium borohydride and subsequent esterification with nitrosyl chloride of the resulting 5,16-pregnadiene-1β,3β,20α-triol 1,3-diacetate and irradiation with ultraviolet light of the 20α-nitrite ester thereby formed.

According to my process, the 16-dehydro-20α-nitrite-pregnane esters, after preparation and isolation as described above, are dissolved in a non-reactive solvent containing 1% pyridine prior to being irradiated with ultraviolet. The solvent chosen preferably has a high degree of transparency to the ultraviolet radiation within the specified band of nitrite absorption. Solvents which may be used for the photolysis of the nitrite include acetic acid, acetone, acetonitrile, benzene, carbon disulfide, carbon tetrachloride, chlorobenzene, chloroform, cyclohexane, dimethylether, dimethylformamide, dioxane, ethyl acetate, Freon 113, heptane, methanol, ethanol, methylene chloride, and toluene. Of these, benzene and toluene yield preferred results.

It has been found advantageous in this process to add about 1% by volume of pyridine to the photolysis solution, to inhibit competing reactions during the irradiation of the solution of the 20α-nitrite.

While the solvents used in the photolysis are ordinarily water-free, a small amount of moisture in the solvent used for photolysis does not ordinarily interfere with the progress of the ultraviolet activation and rearrangement of the nitrite in accordance with the present invention.

The ultraviolet radiation used to activate the nitrite radical so as to cause it to be transferred in part to the 16-carbon atom with concomitant splitting of one of the bonds between C–16 and C–17 resulting in the formation of the 16-oximino function and the 17β,20α-epoxy function, is that band of radiant energy which corresponds to some or all of the ultraviolet absorption of the nitrite radical, and from 3000 A. to 4400 A. This energy is conveniently supplied by a Hanovia high pressure mercury arc lamp with a Pyrex sleeve, while the nitrite to be reacted is contained in an ultraviolet transmitting vessel such as a water cooled Vycor-immersion well.

During the course of the photolysis of a 20α-nitrite ester of a pregnane, a stream of nitrogen or other inert gas is preferably (although not always necessarily) bubbled through the solution to keep the nitrite solution protected by an inert atmosphere.

The photolysis of the nitrite ester which is carried on by irradiation with the selected band of ultraviolet radiation is monitored from time to time by testing aliquots with diphenylamine hydrochloride reagent. The reaction is complete when the aliquot ceases to give a blue color with the reagent.

My process where a 16-dehydro-20α-nitrite pregnane is irradiated by ultraviolet light is usually carried out utilizing a 200 watt mercury lamp as an ultraviolet light source with the irradiated material being dissolved in benzene containing 1% pyridine based on the volume of solvent, the pyridine-containing-benzene solution being kept under an atmosphere of nitrogen. The irradiation is usually continued for about an hour, at temperatures in the range of −5° to +20° C., and preferably in the range of 7° to 13° C. The novel 16-oximino-17β,20α-oxidopregnanes formed by the irradiation with ultraviolet light of the 20α-nitrite-16-dehydropregnane are usually isolated by concentrating in vacuo the photolyzed solution with subsequent crystallization of the resultant residue in an organic solvent such as acetone, hexane, ethyl acetate, and the like.

By my process, as described hereinabove, a compound such as 4,16-pregnadiene-20α-ol-3-one is first reacted with nitrosyl chloride in pyridine to yield 4,16-pregnadiene-20α-ol-3-one 20-nitrite which, upon irradiation from a 200 watt mercury lamp while in a benzene solution containing 1% pyridine for about one hour at 10° C. while under a blanket of nitrogen yields 16-oximino-17β,20α-oxido-4-pregnene-3-one which is purified by recrystallization from acetone. Similarly, by my process, 5,16-pregnadiene-3β,20α-diol is reacted with nitrosyl chloride in pyridine to give the corresponding 3β,20α-dinitrite ester which upon irradiation in a pyridine-containing-benzene solution yields 16-oximino-17β,20α-oxido - 5 - pregnene-3β-ol.

The novel 16-oximino-17β,20α-oxidopregnanes of Formulae I, II, and III including the 2 and 6 methyl homologs thereof have been found to possess anti-fertility properties when tested in mice.

In addition, the 16-oximino-17β,20α-oxidopregnanes of my invention are valuable as intermediates in preparing the novel 16-oximino-20-ketopregnanes of Formulae IV, V, and VI which, in turn, are valuable intermediates in preparing 16-amino-20-ketosteroids which are known, therapeutically active compounds.

The 16-oximino-20-ketopregnanes of Formulae IV, V, and VI, are prepared from the corresponding 16-oximino-17β,20α-oxido-pregnanes of Formulae I, II, and III by reaction with a dilute aqueous solution of an alkali metal hydroxide such as potassium hydroxide. Usually the 16-oximino-17β,20α-oxido-pregnane of Formulae I, II, or III is dissolved in an inert solvent, and preferably dioxane, to which is added, under a blanket of nitrogen, a molar excess of a 10% aqueous solution of base, and the mixture is refluxed a short time (usually from 5 to 20 minutes). After cooling, the reaction mixture is neutralized with acetic acid, the 16-oximino-20-ketopregnane formed is isolated by extraction with an organic solvent. Purification of the 16-oximino-20-ketopregnane thus formed is accomplished by known recrystallization or chromatographic techniques.

Utilizing the process described hereinabove, 16-oximino-17β,20α-oxido-4-pregnene-3-one (prepared by the ultraviolet irradiation of 4,16-pregnadiene-20α-ol-3-one 20-nitrite in a pyridine-benzene solution) in dioxane solution, to which has been added a molar excess of 10% aqueous potassium hydroxide, is refluxed for 12 minutes (under nitrogen) then cooled and extracted with methylene chloride. Evaporation of the methylene chloride extracts, followed by purification of the resultant residue via chromatographic techniques, such as that utilizing a Florisil column eluted with ether-benzene (2:3), yields 16-oximino-progesterone (i.e., 16-oximino - 4 - pregnene-3,20-dione).

Similarly, 16-oximino-17β,20α-oxido-5-pregnene-3β - ol- in dioxane containing a molar excess of 10% potassium hydroxide upon refluxing under nitrogen yields a compound of Formula VI, 16-oximino-5-pregnene-3β-ol-20-one.

By my novel process whereby the 16-oximino-17β,20α-oxido-pregnanes of Formulae I, II, and III are reacted with an alkaline solution to form the corresponding 16-oximino-20-ketopregnanes of Formulae IV, V, and VI, it is now possible to prepare hitherto unknown monooximes of poly-ketones. These 16-mono-oximes may be reduced either electrolytically or with aluminium amalgam to yield the corresponding 16-amino-20-keto compounds which are known compounds having therapeutic activity. Thus, for example, by my process as outlined hereinabove, 5,16-pregnadiene-1β,3β-diol-20-one diacetate may be reduced with lithium aluminum hydride and the isomeric mixture separated via chromatographic techniques to give 5,16-pregnadiene-1β,3β,20α-triol 1,3-diacetate which upon subsequent reaction with nitrosyl chloride in pyridine, yields 5,16-pregnadiene-1β,3β,20α-triol 1,3-diacetate 20-nitrite. Irradiation of the latter 1,3-diacetate 20-nitrite ester in benzene containing 1% pyridine with a 200 watt mercury lamp and isolation as heretofore described yields the novel 16-oximino-17β,20α-oxido - 5-pregnene-1β,3β-diol diacetate which, upon treatment with 10% aqueous potassium hydroxide produces the novel 16-mono-oxime of Formula VI, i.e., 16-oximino-5-pregnene-1β,3β-diol-20-one. Reduction of the latter compound with aluminium amalgam according to known techniques yields 16α-amino-5-pregnene-1β,3β-diol-20-one which is a known compound valuable as a coronary dilator.

To prepare the 1-dehydro analogs of Formulae II and V, one can utilize as starting compound a 20α-hydroxy-16-dehydro-1,4-pregnadiene, and prepare the 20α-nitrite ester thereof. Subsequent photolysis of the aforementioned 20α-nitrite with utraviolet light yields the corresponding novel compound of Formula II, namely the 16-oximino-17β,20α-oxido-1,4-pregnadiene.

Alternatively, a 16-oximino-17β,20α-oxido-1,4 - pregnadiene or a 16-oximino-20-keto-1,4-pregnadiene may be prepared by dehydrogenation of a corresponding 4-pregnene of Formulae II and IV respectively either by microbiological techniques such as that utilizing *Corynebacterium simplex* in the manner described in U.S. Patent No. 2,837,464, or by chemical methods such as that utilizing selenium dioxide in dioxane.

Thus, according to my invention, 1,4,16-pregnatriene-3,20-dione is reduced with lithium aluminum hydride and the resultant 1,4,16-pregnatriene-20α-ol-3-one upon treatment with nitrosylchloride in pyridine is converted to the corresponding 20-nitrite ester. Upon irradiation of the 1,4,16-pregnatriene-20α-ol-3-one 20-nitrite with ultraviolet light there is formed a novel compound of Formula II, namely, 16-oximino-17β,20α-oxido-1,4-pregnadiene-3-one, which upon treatment with aqueous 10% potassium hydroxide, is converted to a novel compound of Formula V, i.e., 16-oximino-1,4-pregnadiene-3,20-dione. Alternatively, 16-oximino-17β,20α-oxido-4-pregnene and 16-oximino-4-pregnene-3,20-dione, prepared according to my invention, are each treated with *Corynebacterium simplex* and there are obtained the corresponding 1,4-dienes, respectively of my invention.

The 16-acyloxyimino - 17β,20α - oxidopregnanes, the compounds of Formulae I, II, and III and the 16-acyloxyimino-20-keto pregnanes of Formulae IV, V, and VI, wherein R is an acyl residue of the hydrocarbon carboxylic acid, are conveniently prepared from the corresponding 16-oximino steroids (i.e., wherein R is hydrogen) utilizing conventional esterification techniques such as that using an acid anhydride or acid chloride with pyridine. Under usual esterification conditions, any free hydroxyl groups, such as a C–1, C–3, or C–21 hydroxyl, will also esterify, so that 16-oximino-17β,20α-oxido-4-pregnene-21-ol-3,11-dione upon reaction with acetic anhydried in pyridine will yield the 16,21-diacetate.

Thus, 16 - oximino - 17β,20α - oxido-4-pregnene-3-one upon reaction with acetic anhydride in pyridine will yield the corresponding 16-acetyloximinopregnane, whereas reaction of the aforementioned oximinooxido steroid with benzoyl chloride in pyridine will yield the corresponding benzoyloximino pregnane.

Similarly, 16 - oximinoprogesterone (16 - oximino-4-pregnene-3,20-dione) is reacted with propionic anhydride in pyridine to give 16-oximino-4-pregnene-3,20-dione propionate.

My invention will appear more fully from the examples which follow. These examples are set forth by way of illustration only, and it is to be understood that the invention is not to be construed as limited to the details contained therein as many modifications in materials and methods will be apparent from the disclosure to those skilled in the art. The invention is to be limited only by the scope of the appended claims.

EXAMPLE 1

4,16-Pregnadiene-20α-Ol-3-One

A. 3,5,16-PREGNATRIENE-3-OL-20-ONE 3-METHYL ETHER

Dissolve 300 mg. of 4,16-pregnadiene-3,20-dione in 2.5 ml. of 2,2-dimethoxy propane and 2.5 ml. of dimethylformamide then add 8 mg. of p-toluenesulfonic acid monohydrate and 0.1 ml. of methanol. Reflux the resulting solution for 3½ hours then cool and neutralize with 45 mg. of sodium bicarbonate. Slowly add the neutralized solution to 200 ml. of ice water, and stir for ½ hour. The resulting precipitate is filtered and dried to give 3,5,16-pregnatriene-3-ol-20-one 3-methyl ether, which is used without further purification in the procedure of Example 1B.

B. 4,16-PREGNADIENE-20α-OL-3-ONE

Dissolve the 3,5,16-pregnatriene-3-ol-20-one 3-methylether prepared as described in Example 1A and add the ethereal solution to an ice cold solution of 400 mg. of lithium aluminum hydride in 40 ml. of tetrahydrofuran. Reflux the solution for 4 hours then cool and add ethyl acetate to destroy any excess lithium aluminum hydride, then add saturated sodium sulfate solution. Decant the organic layer from the aqueous solution and evaporate the organic layer to a residue to which is added 7.5 ml. of methanol and 0.18 ml. of 2N-hydrochloric acid. Leave the solution overnight then pour into excess water and bring to neutrality with sodium bicarbonate then extract with methylene chloride. Combine the organic extracts, dry over sodium sulfate and concentrate to a residue which is chromatographed as follows: Dissolve the residue in a minimum of benzene and chromatograph over 9 g. of Florisil and elute with ether. Combine the ether-benzene eluates and recrystallize from isopropylether to give 4,16-pregnadiene-20α-ol-3-one; M.P. 185–188° C. (transition at 175° C.); $R_f = 0.14$ (ligroin-propylene glycol); $\epsilon_{241} = 15,400$; $\lambda^{Nujol}$ at 2.92, 6.02, 6.22μ;

$[\alpha]_D^{24} = +103.8$ (dioxane), $+110.2$ (chloroform). The 4,16-pregnadiene-20α-ol-3-one has a positive tetranitromethane test.

EXAMPLE 2

*16-Oximino-17β,20α-Oxido-4-Pregnene-3-One*

A. 4,16-PREGNADIENE-20α-OL-3-ONE 20-NITRITE

Dissolve 409 mg. of 4,16-pregnadiene-20α-ol-3-one in 40 ml. of dry pyridine and cool the solution to minus 25° C. To this solution in a substantially anhydrous system add dropwise with stirring a freshly prepared solution of nitrosyl chloride in pyridine (about 1:5). The nitrosyl chloride is added until the appearance of a powder-blue tint indicates the end point. Add a few drops more of nitrosyl chloride and stir the resultant orange-brown solution for 5 minutes then add 800 ml. of ice water. Filter the precipitate which separates and dry at room temperature overnight, to give, 4,16-pregnadiene-20α-ol-3-one 20-nitrite $[\alpha]_D^{23}$ $+104$ (chloroform 1% pyridine) which is used without further purification in the procedure of Example 2B.

B. 16-OXIMINO-17β-20α-OXIDO-4-PREGNENE-3-ONE

Dissolve the 4,16-pregnadiene-20α-ol-3-one 20-nitrite prepared in Example 2A in 190 ml. of benzene containing 1% pyridine. Dry the solution over sodium sulfate and filter into a water cooled Vycor immersion well which is in proximity to a 200 watt Hanovia high pressure mercury arc lamp. Irradiate the dry benzene solution for 1 hour under nitrogen at 10° C. with the 200 watt mercury arc lamp until a spot test indicates the complete disappearance of the nitrite ester. Then concentrate the benzene solution in vacuo at 50° C. to a residue which is triturated with acetone, filtered and recrystallized from acetone to give 16-oximino-17β,20α-oxido-4-pregnene-3-one; M.P. 211–225° C.; $e_{239.5}=17,700$; $[\alpha]_D^{22}$ $-56.7$ (dioxane), $-42.8$ (chloroform); $\gamma^{Nujol}$ at 3.09, 6.08, 6.24μ; no color with tetranitromethane or ferric chloride and $R_f=0.25$ (ligroin: toluene, 1:1-propylene glycol).

EXAMPLE 3

*16-Oximino-17β-20α-Oxido-4-Pregnene-3-One Acetate*

Dissolve 150 mg. of 16-oximino-17β-20α-oxido-4-pregnene-3-one in 6 ml. of pyridine and add 3 ml. of acetic anhydride. Leave the solution at room temperature for 2 hours then pour into 200 ml. of ice water. Filter the precipitate which separates and recrystallize from acetone-hexane to give 16-oximino-17β-20α-oxido-4-pregnene-3-one acetate; M.P. 173–177° C.; $e_{237.5}=18,500$; $\gamma^{Nujol}$ at 5.67, 6.08, 6.24, 7.9, 8.08, 8.22, 8.38 and 8.48μ; $[\alpha]_D^{25}$ $-74.2°$ (chloroform).

Other acetic anhydrides such as, propionic anhydride, butyric anhydride, and caproic anhydride may be substituted for acetic anhydride in the above procedure and there will be obtained, respectively, 16-oximino-17β,20α-oxido-4-pregnene-3-one propionate, 16-oximino-17β,20α-oxido-4-pregnene-3-one butyrate, and 16-oximino-17β-20α-oxido-4-pregnene-3-one caproate.

In addition, benzoyl chloride may be substituted for acetic anhydride in the above procedure to give 16-oximino-17β-20α-oxido-4-pregnene-3-one benzoate.

EXAMPLE 4

*16-Oximino-17β,20α-Oxido-5-Pregnene-3β-Ol*

A. 5,16-PREGNADIENE-3β,20α-DIOL DINITRITE

React 5,16-pregnadiene-3β,20α-diol with nitrosyl chloride according to the procedure described in Example 2A to give 5,16-pregnadiene-3β,20α-diol dinitrite.

B. 16-OXIMINO-17β,20α-OXIDO-5-PREGNENE-3β-OL

Dissolve 5,16-pregnadiene-3β,20α-diol dinitrite in benzene and irradiate with ultraviolet light in the manner described in Example 2B and isolate the resultant product in the manner described therein. Triturate the isolated product with ethyl acetate and filter to give 16-oximino-17β,20α-oxido-5-pregnene-3β-ol.

16-oximino-17β,20α-oxido-5-pregnene-3β-ol may be reacted with acetic anhydride in pyridine according to the procedure described in Example 3 to give 16-oximino-17β,20α-oxido-5-pregnene-3β-ol diacetate.

EXAMPLE 5

*4,16-Pregnadiene-20α,21-Diol-3,11-Dione 21-Acetate*

Dissolve 200 mg. of 4,16-pregnadiene-21-ol-3,11,20-trione 21-acetate in 5 ml. of methanol. Cool to 0° C. and add 43 mg. of sodium borohydride in 2 ml. of methanol. Stir the solution at 0° C. for 10 minutes then neutralize with acetic acid and concentrate the reaction mixture to a small volume. Chromatograph the residual oil on silica gel eluting with hexane-ether. Combine the like fractions and concentrate to a residue substantially of 4,16-pregnadiene-20α,21-diol-3,11-dione 21-acetate.

EXAMPLE 6

*16-Oximino-17β,20α-Oxido-4-Pregnene-21-Ol-3,11-Dione*

A. 4,16-PREGNADIENE-20α,21-DIOL-3,11-DIONE 20-NITRITE 21-ACETATE

React 4,16-pregnadiene-20α,21-diol-3,11-dione 21-acetate with nitrosyl chloride in pyridine according to the procedure of Example 2A, to give, 4,16-pregnadiene-20α,21-diol-3,11-dione 20-nitrite 21-acetate.

B. 16-OXIMINO-17β,20α-OXIDO-4-PREGNENE-21-OL-3,11-DIONE 21-ACETATE

Irradiate 4,16-pregnadiene-20α,21-diol-3,11-dione 20-nitrite 21-acetate in benzene with ultraviolet light according to the procedure of Example 2B. The resultant product is isolated as described to give 16-oximino-17β,20α-oxido-4-pregnene-21-ol-3,11-dione 21-acetate.

C. 16-OXIMINO-17β,20α-OXIDO-4-PREGNENE-21-OL-3,11-DIONE

Subject 16-oximino-17β,20α-oxido-4-pregnene-21-ol-3,11-dione 21-acetate to the action of a culture of *Flavobacterium dehydrogenans* (Rutgers Collection No. 130) according to the following procedure.

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Grams |
|---|---|
| Yeast extract (Difco) | 10 |
| Potassium phosphate monobasic | 4.48 |
| Sodium phosphate dibasic | 4.68 |
| Tap water to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 16-oximino-17β,20α-oxido-4-pregnene-21-ol-3,11,dione 21-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 16-oximino-17β,20α,oxido - 4 - pregnene-21-ol-3,11-dione.

The diacetate ester of the compound of this example is prepared by reacting 16-oximino-17β,20α-oxido-4-pregnene-21-ol-3,11-dione (the compound of Example 6C) on the 21-acetate ester thereof (the compound of Example 6B) with acetic acid in pyridine according to the procedure of Example 3.

EXAMPLE 7

*16-Oximino-17β,20α-Oxido-1,4-Pregnadiene-3-One*

Subject 16-oximino-17β,20α-oxido-4-pregnene-3-one (the compound of Example 2) to the action of *Bacillus sphaericus* var. *fusiformis* (A.T.C.C. 7055) in the following manner:

*Bacillus sphaericus* var. *fusiformis* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28° C.

To 100 ml. of a sterile nutrient broth (composed of Bacto-beef extract, 3 g.; Bacto-peptone, 5 g.; per liter of tap water) in a 300 ml. flask is added one loopful of the incubated culture and the broth mixture is further incubated for 24 hours at 28° C. on a shaking machine. The broth culture so obtained is employed as an inoculum (1%).

Into each of ten flasks containing 100 ml. of sterile nutrient broth is added 1 ml. of the inoculum. The flasks are agitated on a rotary shaker for 8 hours at 28° C. at 240 strokes per minute. After this growth period, a solution of 25 mg. of 16-oximino-17β,20α-oxido-4-pregnene-3-one in 0.5 ml. of methanol is aseptically added to each flask which in turn is reshaken and incubated for an additional 24 hours. The final pH is 7.8.

The contents of the flasks are then combined and extracted three times with 2 liters of chloroform per extraction. The combined chloroform extracts are evaporated to dryness yielding 310 mg. of crude product. The crude steroid is purified by chromatography on a Florisil.

Alternatively, the crude product is recrystallized from acetone to give 16-oximino-16β,20α-oxido-1,4-pregnadiene-3-one.

Alternatively, the compound of this example is prepared by subjecting 16-oximino-17β,20α-oxido-5-pregnene-3β-ol (the compound of Example 4) to the action of *Bacillus sphaericus* according to the above procedure.

EXAMPLE 8

*16-Oximino-17β,20α-Oxido-1,4-Pregnadiene-21-Ol-3,11-Dione*

Subject to the action of *Bacillus sphaericus* 16-oximino-17β,20α-oxido-4-pregnene-21-ol-3,11-dione (the compound of Example 6C) according to the procedure of Example 7. The resultant product is 16-oximino-17β,20α-oxido-1,4-pregnadiene-21-ol-3,11-dione.

Reaction of the compound of this example with acetic acid in pyridine according to the procedure of Example 3 gives 16-oximino-17β,20α-oxido-1,4-pregnadiene-21-ol-3,11-dione diacetate.

EXAMPLE 9

*16-Oximinoprogesterone*

To a solution of 1.95 g. of 16-oximino-17β,20α-oxido-4-pregnene-3-one (the compound of Example 2) in 100 ml. of dioxane under nitrogen, add 100 ml. of 10% aqueous potassium hydroxide and stir the mixture at reflux temperature for 12 minutes. Cool the reaction mixture, then neutralize with acetic acid and extract with methylene chloride. Combine the methylene chloride extracts, then wash with water, dry over sodium sulfate and evaporate in vacuo to a residue. Chromatograph the residue on Florisil eluting with ether-benzene (2-3). The ether-benzene eluates are combined and concentrated in vacuo to give 16-oximino progesterone, M.P. 240–246° C.

In a similar manner, 16-oximino-17β,20α-oxido-5-pregnene-3β-ol (the compound of Example 4), 16-oximino-17β,20α-oxido-4-pregnene-21-ol-3,11-dione (the compound of Example 6), 16-oximino-17β,20α-oxido-1,4-pregnadiene-3-one (the compound of Example 7), and 16-oximino-17β,20α-oxido-1,4-pregnadiene-21-ol-3,11-dione (the compound of Example 8) are each reacted with aqueous potassium hydroxide according to the procedure of this example to yield respectively, 16-oximino-5-pregnene-3β-ol-20-one, 16-oximino-4-pregnene-21-ol-3,11,20-trione, 16-oximino-1,4-pregnadiene-3,20-dione, and 16-oximino-1,4-pregnadiene-21-ol-3,11,20-trione.

EXAMPLE 10

*16-Oximinoprogesterone Acetate*

16-oximinoprogesterone is reacted with pyridine and acetic anhydride in the manner described in Example 3 to give, 16-oximinoprogesterone acetate.

Similarly, 16-oximino-5-pregnene-3β-ol-20-one, 16-oximino-4-pregnene-21-ol-3,11,20-trione, 16-oximino-1,4-pregnadiene-3,20-dione and 16-oximino-1,4-pregnadiene-21-ol-3,11,20-trione are each reacted with acetic anhydride in pyridine according to the procedure of Example 3 to give respectively, 16-oximino-5-pregnene-3β-ol-20-one 3,16-diacetate, 16-oximino-4-pregnene-21-ol-3,11,20-trione 16,21-diacetate, 16-oximino-1,4-pregnadiene-3,20-dione acetate and 16-oximino-1,4-pregnadiene-21-ol-3,11,20-trione 16,21-diacetate.

In the above procedure benzoylchloride may be substituted by acetic anhydride to give the respective benzoate esters, i.e., 16-oximinoprogesterone benzoate, 16-oximino-5-pregnene-3β-ol-20-one 3,16-dibenzoate, 16-oximino-4-pregnene-21-ol-3,11,20-trione, 16,21-dibenzoate, 16-oximino-1,4-pregnadiene-3,20-dione benzoate and 16-oximino-1,4-pregnadiene-21-ol-3,11,20-trione 16,21-dibenzoate.

EXAMPLE 11

*16-Oximino-17β,20α-Oxido-5-Pregnene-1β,3β-Diol*

A. 5,16-PREGNADIENE-1β,3β-DIOL-20-ONE DIACETATE

Treat 5,16-pregnadiene-1β,3β-diol-20-one with acetic anhydride in pyridine in a manner similar to that described in Example 3, isolate the product in the described manner and air-dry to give, 5,16-pregnadiene-1β,3β-diol-20-one diacetate.

B. 5,16-PREGNADIENE-1β,3β,20α-TRIOL 1,3-DIACETATE

Treat 5,16-pregnadiene-1β,3β-diol-20-one 1,3-diacetate with sodium borohydride in methanol in a manner similar to that described in Example 5. Chromatograph the resultant product on silica gel eluting with hexane-ether according to the described procedure to give 5,16-pregnadiene-1β,3β,20α-triol 1,3-diacetate.

C. 5,16-PREGNADIENE-1β,3β,20α-TRIOL 1,3-DIACETATE 20-NITRITE

Treat 5,16-pregnadiene-1β,3β,20α-triol 1,3-diacetate with nitrosyl chloride in pyridine in a manner similar to that described in Example 2A. Isolate the resultant product in the described manner to give 5,16-pregnadiene-1β,3β,20α-triol 1,3-diacetate 20-nitrite.

D. 16-OXIMINO-17β,20α-OXIDO-5-PREGNENE-1β,3β-DIOL 1,3-DIACETATE

Irradiate a solution of 5,16-pregnadiene-1β,3β,20α-triol 1,3-diacetate 20-nitrite in benzene containing 1% pyridine with a 200 watt Hanovia mercury arc lamp according to the procedure of Example 2B. Isolate and purify the resultant product in the described manner to give 16-oximino-17β,20α-oxido-5-pregnene-1β,3β-diol 1,3-diacetate.

E. 16-OXIMINO-17β,20α-OXIDO-5-PREGNENE-1β,3β-DIOL

Subject 16-oximino-17β,20α-oxido-5-pregnene-1β,3β-diol 1,3-diacetate to the action of a culture of *Flavobacterium dehydrogenans* according to the procedure of Example 6C. Isolate in the described manner to give, 16-oximino-17β,20α-oxido-5-pregnene-1β,3β-diol.

EXAMPLE 12

16-Oximino-5-Pregnene-1β,3β-Diol-20-One

Treat 16-oximino-17β,20α-oxido-5-pregnene-1β,3β-diol (compound of Example 11) with an aqueous solution of potassium hydroxide in dioxane according to the procedure of Example 9. Isolate the resultant product in the described manner to give 16-oximino-5-pregnene-1β,3β-diol-20-one.

Alternatively, the compound of this example is prepared by allowing 16-oximino-17β,20α-oxido-5-pregnene-1β,3β-diol 1,3-diacetate (the compound of Example 11D) to react with 10% aqueous potassium hydroxide in dioxane in a manner similar to that described in Example 9 but increasing the reflux time from 12 to 20 minutes.

EXAMPLE 13

6-Methyl-16-Oximino-17β,20α-Oxido-5-Pregnene-3β-Ol 3-Acetate

A. 6-METHYL-5,16-PREGNADIENE-3β,20α-DIOL 3-ACETATE

Treat 6-methyl-5,16-pregnadiene-3β-ol-20-one 3-acetate with lithium aluminum hydride according to the procedure of Example 1B. Chromatograph on Florisil in the described manner to give 6-methyl-5,16-pregnadiene-3β,20α-diol 3-acetate.

B. 6-METHYL-5,16-PREGNADIENE-3β,20α-DIOL 3-ACETATE 20-NITRITE

Treat 6-methyl-5,16-pregnadiene-3β,20α-diol 3-acetate with nitrosyl chloride in pyridine according to the procedure of Example 2A. Isolate and purify the resultant product in the described manner to give 6-methyl-5,16-pregnadiene-3β,20α-diol 3-acetate 20-nitrite.

C. 6-METHYL-16-OXIMINO-17β,20α-OXIDO-5-PREGNENE-3β-OL 3-ACETATE

Irradiate a solution of 6-methyl-5,16-pregnadiene-3β,20α-diol 3-acetate 20-nitrite in benzene containing 1% pyridine according to the procedure of Example 2B. Isolate the resultant product in the described manner to give 6 - methyl - 16 - oximino-17β,20α-oxido-5-pregnene-3β-ol 3-acetate.

D. 6-METHYL-16-OXIMINO-17β,20α-OXIDO-5-PREGNENE-3β-OL

Subject the 3-acetate ester of Example 13C to the action of *Flavobacterium dehydrogenans* according to the procedure of Example 6C. Isolate and purify the resultant product to give 6-methyl-16-oximino-17β,20α-oxido-5-pregnene-3β-ol.

EXAMPLE 14

6-Methyl-16-Oximino-5-Pregnene-3β-Ol-20-One

6 - methyl - 16-oximino-17β,20α-oxido-5-pregnene-3β-ol is allowed to react with 10% aqueous potassium hydroxide in dioxane in the manner described in Example 6C. Isolate the resultant product in the described manner to give 6-methyl-16-oximino-5-pregnene-3-β-ol-20-one.

EXAMPLE 15

16-Oximino-17β,20α-Oxido-4-Pregnene-3,11-Dione

A. 3-ETHYLENEDIOXY-5,16-PREGNADIENE-20α-OL-11-ONE

Treat 3 - ethylenedioxy-5,16-pregnadiene-11,20-dione with sodium borohydride in the manner described in Example 15. Isolate the resultant product in the described manner to give 3-ethylenedioxy-5,16-pregnadiene-20α-ol-11-one.

B. 4,16-PREGNADIENE-20α-OL-3,11-DIONE

To 300 mg. of 3-ethylenedioxy-5,16-pregnadiene-20α-ol-11-one add 750 ml. of methanol and 18 ml. of 2 N-hydrochloric acid. Leave the solution overnight then pour into excess water, bring to neutrality with sodium bicarbonate and extract with methylenechloride. Combine the organic extracts, dry over sodium sulfate and concentrate to a residue. The resultant residue is chromatographed on Florisil in a minimum of benzene, eluting with ether to give 4,16-pregnadiene-20α-ol-3,11-dione.

C. 4,16-PREGNADIENE-20α-OL-3,11-DIONE 20-NITRITE

Treat 4,16-pregnadiene-20α-ol-3,11-dione with nitrosyl chloride in pyridine according to the procedure of Example 2A. Isolate the resultant product as described to give 4,16-pregnadiene-20α-ol-3,11-dione 20-nitrite.

D. 16-OXIMINO-17β,20α-OXIDO-4-PREGNENE-3,11-DIONE

Irradiate a solution of 4,16-pregnadiene-20α-ol-3,11-dione 20-nitrite in benzene containing 1% pyridine with ultraviolet light in the manner described in Example 2B. Isolate and purify the resultant product in the described manner to give 16-oximino-17β,20α-oxido-4-pregnene-3,11-dione.

EXAMPLE 16

16-Oximino-4-Pregnene-3,11,20-Trione

Treat 16-oximino-17β,20α-oxido-4-pregnene-3,11-dione with 10% aqueous potassium hydroxide in dioxane according to the procedure of Example 9. Isolate and purify the resultant product in the described manner to give 16-oximino-4-pregnene-3,11,20-trione.

I claim:

1. A 16-oximino steroid selected from the group consisting of pregnanes having the following structural formulae, and the 6-methyl analogs thereof:

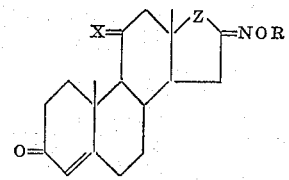

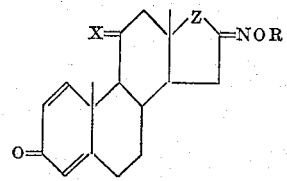

and

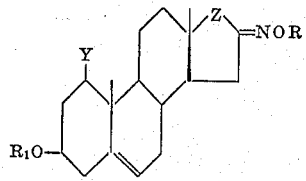

wherein X is a member selected from the group consisting of hydrogen and oxygen; Y is a member selected from the group consisting of H and $OR_2$; R, $R_1$, and $R_2$ being members selected from the group consisting of hydrogen and an acyl radical of a hydrocarbon carboxylic acid having up to 8 carbon atoms; and Z is a member selected from the group consisting of the following:

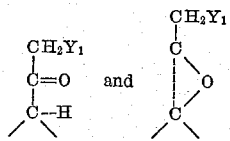

wherein $Y_1$ is a member selected from the group consisting of hydrogen and $-OR_3$, $R_3$ being a member of the group consisting of hydrogen and an acyl radical of a hydrocarbon carboxylic acid having up to eight carbon atoms.

2. 16-oximino-17β,20α-oxido-4-pregnene-3-one.

3. 16-oximino-17β,20α-oxido-4-pregnene-3-one acetate.
4. 16 - oximino - 17β,20α - oxido - 4 - pregnene - 3, 11-dione.
5. 16-oximino-17β,20α-oxido-5-pregnene-3β-ol.
6. 16 - oximino - 17β,20α - oxido - 4 - pregnene - 21-ol-3,11-dione.
7. 16 - oximino - 17β,20α - oxido - 4 - pregnene - 21-ol-3,11-dione 21-acetate.
8. 16 - oximino - 17β,20α - oxido - 1,4 - pregnadiene-3-one.
9. 16 - oximino - 17β,20α - oxido - 1,4 - pregnadiene-21-ol-3,11-dione.
10. 16 - oximino - 17β,20α - oxido - 5 - pregnene-1β,3β-diol.
11. 16-oximino-4-pregnene-3,20-dione.
12. 16-oximino-4-pregnene-3,11,20-trione.
13. 16-oximino-5-pregnene-3β-ol-20-one.
14. 16-oximino-1,4-pregnadiene-3,20-dione.
15. 16 - oximino - 1,4 - pregnadiene - 21 - ol - 3,11, 20-trione.
16. 6 - methyl - 16 - oximino - 17β,20α - oxido - 5-pregnene-3β-ol.
17. In the process of preparing a 16-oximinopregnane selected from the group consisting of compounds having the following structural formulae and the 6-methyl analogs thereof:

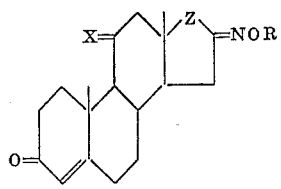

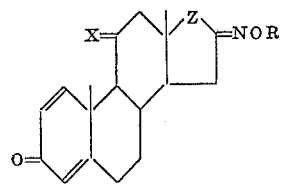

and

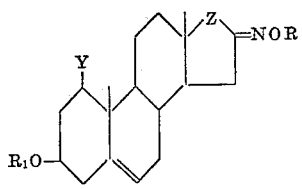

wherein X is a member selected from the group consisting of hydrogen and oxygen; Y is a member selected from the group consisting of H and $OR_2$; R, $R_1$, and $R_2$ being members selected from the group consisting of hydrogen and an acyl radical of a hydrocarbon carboxylic acid having up to 8 carbon atoms; and Z is a member selected from the group consisting of the following:

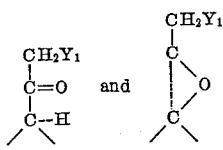

wherein $Y_1$ is a member selected from the group consisting of hydrogen and $-OR_3$, $R_3$ being a member selected from the group consisting of hydrogen and an acyl radical of a hydrocarbon carboxylic acid having up to 8 carbon atoms; the step which comprises irradiating with ultraviolet light a solution of a 20α-nitrite ester selected from the group consisting of compounds of the following formulae:

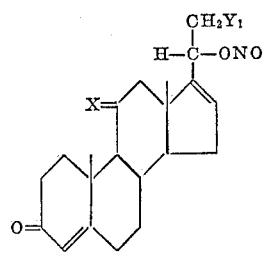

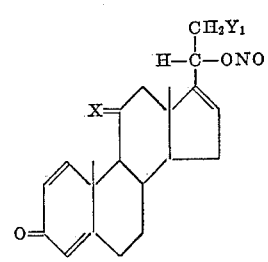

and

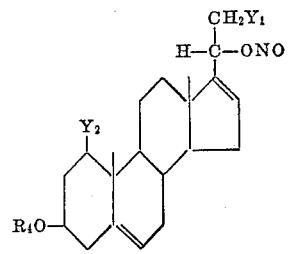

wherein X and $Y_1$ are as heretofore defined, and $Y_2$ is a member selected from the group consisting of H, —ONO, and —$OR_5$, $R_5$ being a member selected from the group consisting of H and an acyl radical of a carboxylic acid containing up to 8 carbon atoms; and $R_4$ is a member selected from the group consisting of H, —NO, and an acyl radical of a carboxylic acid containing up to 8 carbon atoms; said solution containing about 1% pyridine, and said ultraviolet radiation including an absorption band of the nitrite radical.

18. In the process of preparing a 16-oximino-17β,20α-oxido-pregnane selected from the group consisting of compounds having the following structural formulae:

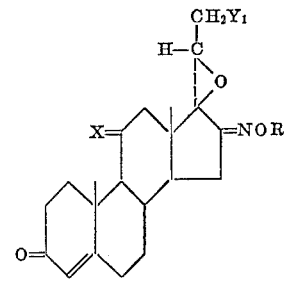

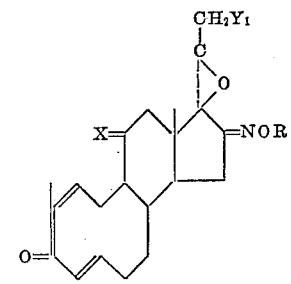

and

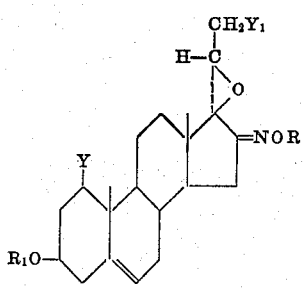

wherein X is a member selected from the group consisting of H and keto; Y and Y₁ are members selected from the group consisting of H and OR₂, R, R₁, and R₂ being members selected from the group consisting of H and an acyl radical of a carboxylic acid having up to 8 carbon atoms; the steps which comprise reacting a nitrosyl halide with a 20α-hydroxy-16-dehydropregnane of the group consisting of compounds having the following structural formulae:

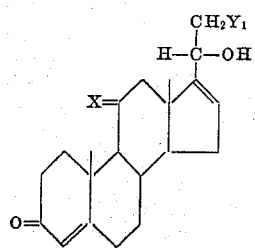

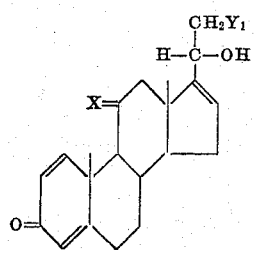

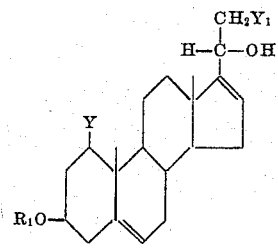

wherein X, Y, Y₁, and R₁ are as heretofore defined; and subjecting to ultraviolet radiation the 16-dehydro-20α-nitrite ester produced thereby in a non-polar solvent containing about 1% by volume of pyridine, said radiation including an absorption band of the nitrite radical; and isolating the 16-oximino-17β,20α-oxido-pregnane thereby produced.

19. In the process of preparing a 16-oximino derivative of a polyketone of the group consisting of:

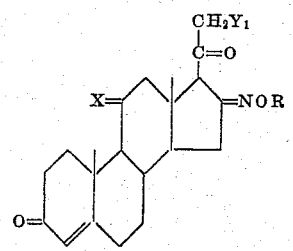

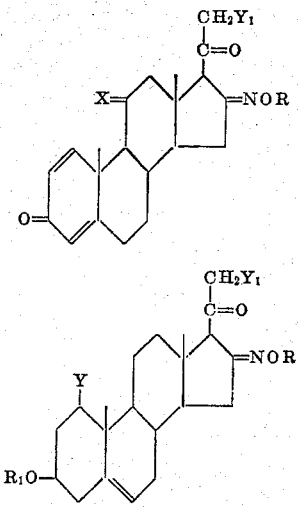

wherein X is a member selected from the group consisting of hydrogen and oxygen; Y and Y₁ are members selected from the group consisting of hydrogen and OR₂; R, R₁, and R₂ being members selected from the group consisting of hydrogen and an acyl radical of a hydrocarbon carboxylic acid having up to 8 carbon atoms; the steps which comprise reacting a dioxane-aqueous solution of an alkali metal hydroxide with a 16-oximino-17β,20α-oxidosteroid of the group consisting of compounds having the following structural formulae:

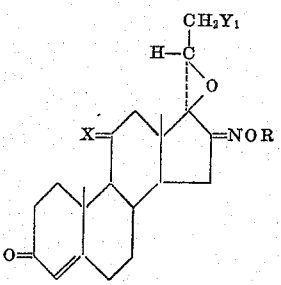

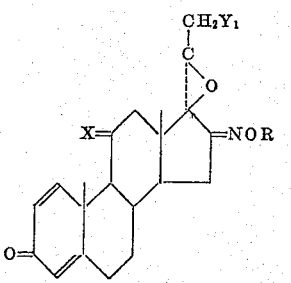

and

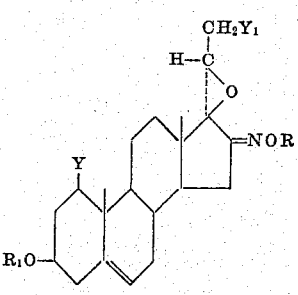

wherein X, Y, Y₁, R and R₁ are as heretofore defined; and isolating the 16-oximino-20-ketopregnane thereby produced.

20. In the process of preparing a 16-oximino derivative of a polyketone of the group consisting of:

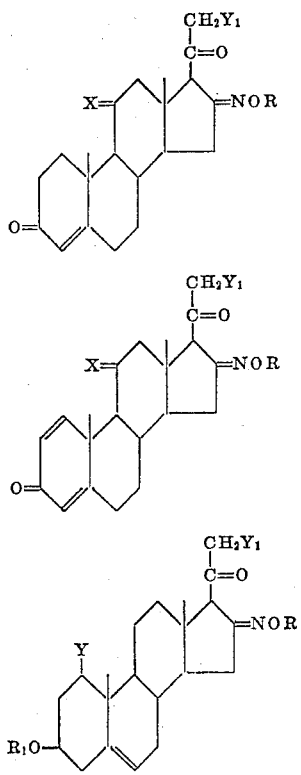

wherein X is a member selected from the group consisting of hydrogen and oxygen; Y and $Y_1$ are members selected from the group consisting of hydrogen and $OR_2$; R, $R_1$, and $R_2$ being members selected from the group consisting of hydrogen and an acyl radical of a hydrocarbon carboxylic acid having up to 8 carbon atoms; the steps which comprise treating with a nitrosyl halide, a 20α-hydroxy-16-dehydropregnane of the group consisting of compounds having the following structural formulae:

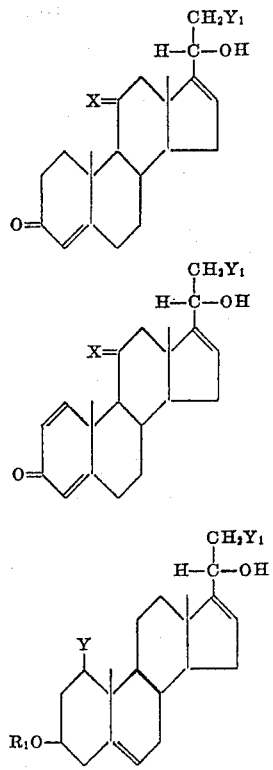

and wherein X, Y, $Y_1$, and $R_1$ are as defined hereinabove; and subjecting to ultraviolet radiation the 16-dehydro-20α-nitrite ester thereby produced in a non-polar solvent containing about 1% by volume of pyridine, said radiation including an absorption band of the nitrite radical at C–20; treating the 16-oximino-17β,20α-oxidopregnane thereby produced with a dioxane-aqueous solution of an alkali metal hydroxide; and isolating the 16-oximino-20-ketopregnane thereby produced.

No references cited.